US012709938B2

(12) United States Patent
Baca et al.

(10) Patent No.: US 12,709,938 B2
(45) Date of Patent: Aug. 18, 2026

(54) MULLING SYSTEM FOR PLURAL FENESTRATION UNITS WITH STIFFENER MEMBER AND COVER MEMBER

(71) Applicant: JELD-WEN, Inc., Charlotte, NC (US)

(72) Inventors: Isidore R. Baca, Oceanside, CA (US); Philip R. Linquist, El Cajon, CA (US)

(73) Assignee: JELD-WEN, Inc.

( * ) Notice: Subject to any disclaimer, the term of this patent is extended or adjusted under 35 U.S.C. 154(b) by 171 days.

(21) Appl. No.: 18/543,405

(22) Filed: Dec. 18, 2023

(65) Prior Publication Data

US 2025/0198225 A1 Jun. 19, 2025

(51) Int. Cl.
*E06B 1/60* (2006.01)
*E06B 1/36* (2006.01)

(52) U.S. Cl.
CPC ............ *E06B 1/366* (2013.01); *E06B 1/6007* (2013.01)

(58) Field of Classification Search
CPC .......... E06B 1/6007; E06B 1/366; E06B 1/13; E06B 1/524; E06B 1/363; E06B 1/38; E06B 1/36; E04B 2/96; E04B 2/962; E04B 2/965
See application file for complete search history.

(56) References Cited

U.S. PATENT DOCUMENTS 5,435,106 A * 7/1995 Garries ................. E06B 1/6007 52/204.5
5,560,155 A * 10/1996 Back ....................... E06B 3/223 52/762
5,771,640 A * 6/1998 Back ....................... E06B 3/223 52/762
5,910,086 A 6/1999 Fisher
6,341,465 B1 1/2002 Riegelman
6,360,498 B1 * 3/2002 Westphal .............. E06B 1/6007 52/204.5
6,722,089 B2 4/2004 Budzinski
D565,199 S * 3/2008 Westphal ..................... D25/122
7,481,028 B2 1/2009 Tufts et al.
7,975,442 B1 * 7/2011 Frey ........................ E04B 2/967 52/204.5

(Continued)

FOREIGN PATENT DOCUMENTS

DE 102008029935 B3 12/2009
GB 1567161 A 5/1961
GB 2386636 A * 9/2003 ............ E04D 3/363

OTHER PUBLICATIONS

Marvin, Marvin Signature Collection, Architectural Detail Manual, Jul. 29, 2019, Ver. 2019.3.

*Primary Examiner* — Kyle J. Walraed-Sullivan
(74) *Attorney, Agent, or Firm* — Ingrassia Fisher & Lorenz, LLP

(57) ABSTRACT

A mulling system includes a stiffener member that is disposed between a first fenestration unit and a second fenestration unit. The stiffener member extends between a first side and a second side of the fenestration assembly. The stiffener member abuts a first frame member of the first fenestration unit and a second frame member of the second fenestration unit. The mulling system also includes a cover member that attaches to the stiffener member on a side. The cover member covers over the first frame member, the second frame member, and the stiffener member to conceal the mull joint on the side.

16 Claims, 6 Drawing Sheets

(56) References Cited

U.S. PATENT DOCUMENTS

| | | | | |
|---|---|---|---|---|
| 8,756,884 | B2 | 6/2014 | Tufts et al. | |
| 9,316,040 | B2 | 4/2016 | Saunders et al. | |
| 9,932,765 | B1 * | 4/2018 | Kelley | E06B 3/964 |
| 10,077,598 | B2 | 9/2018 | Albrecht | |
| 10,087,675 | B2 | 10/2018 | Libby et al. | |
| 10,233,688 | B1 * | 3/2019 | Kelley | E06B 3/964 |
| 10,626,664 | B1 * | 4/2020 | Kelley | E06B 1/366 |
| 10,968,687 | B1 * | 4/2021 | Kelley | E06B 1/366 |
| 11,773,645 | B1 * | 10/2023 | Kelley | E06B 3/9624 52/204.7 |
| 12,116,829 | B1 * | 10/2024 | Hanson | E06B 1/366 |
| 2002/0092248 | A1 * | 7/2002 | Westphal | E06B 1/6007 52/204.5 |
| 2003/0217523 | A1 * | 11/2003 | Budzinski | E06B 1/6007 52/204.5 |
| 2008/0010919 | A1 * | 1/2008 | Tufts | E06B 1/366 52/204.591 |
| 2008/0016800 | A1 * | 1/2008 | Tufts | E06B 1/366 52/204.6 |
| 2013/0212973 | A1 * | 8/2013 | Saunders | E06B 1/366 52/656.5 |
| 2014/0260064 | A1 * | 9/2014 | Hensley | E06B 3/26301 29/515 |
| 2015/0010350 | A1 | 1/2015 | Emanuel | |
| 2015/0020465 | A1 * | 1/2015 | Saunders | E06B 3/663 52/204.6 |
| 2015/0233169 | A1 * | 8/2015 | Saunders | E06B 1/6007 52/204.7 |
| 2017/0350186 | A1 * | 12/2017 | Philips | E06B 3/2632 |
| 2019/0093416 | A1 * | 3/2019 | Luvison | E06B 1/524 |
| 2019/0226268 | A1 * | 7/2019 | Luvison | E06B 1/524 |
| 2023/0383588 | A1 * | 11/2023 | Lund | E06B 1/6007 |
| 2024/0151095 | A1 * | 5/2024 | Snyder | E06B 1/366 |

* cited by examiner

MULLING SYSTEM FOR PLURAL FENESTRATION UNITS WITH STIFFENER MEMBER AND COVER MEMBER

TECHNICAL FIELD

The present disclosure generally relates to a mulling system for plural fenestration units and, more particularly, relates to a mulling system for plural fenestration units with a stiffener member and a cover member.

BACKGROUND

Fenestration units may be joined together via a mulling system to form a plural (i.e., compound) fenestration assembly. For example, two window units may be attached at their respective edges via a mulling system to define the plural fenestration assembly.

However, conventional mulling systems may be inconvenient, difficult, and time consuming to use. Manufacture of these mulling systems may be inefficient. Furthermore, thermal performance and moisture resistance of existing mulling systems may be limited. Additionally, some mulling systems may large and conspicuous, and the mulling system may contribute to an unattractively large, high-profile mull joint between the fenestration units.

Accordingly, it is desirable to provide an improved mulling system that is highly convenient and easy to use. It is also desirable to provide an improved mulling system that provides increased manufacturing efficiencies. Furthermore, it is desirable to provide a mulling system that provides improved thermal performance and/or increased resistance to moisture intrusion. Also, it is desirable to provide a mulling system that is low-profile, inconspicuous, and aesthetically pleasing. Other desirable features and characteristics of the present disclosure will become apparent from the subsequent detailed description and the appended claims, taken in conjunction with the accompanying drawings and this background discussion.

BRIEF SUMMARY

The object of the present disclosure is solved by the subject-matter of the independent claims. Further embodiments are incorporated in the dependent claims.

In one embodiment, a mulling system is disclosed for mulling together a first fenestration unit and a second fenestration unit at a mull joint to define a fenestration assembly. The fenestration assembly includes a first side and a second side that are cooperatively defined by the first fenestration unit and the second fenestration unit. The first fenestration unit includes a first frame member and the second fenestration unit includes a second frame member. The mulling system includes a stiffener member that is disposed between the first fenestration unit and the second fenestration unit. The stiffener member extends between the first side and the second side of the fenestration assembly. The stiffener member abuts the first frame member and the second frame member. The mulling system also includes a cover member that attaches to the stiffener member on the first side. The cover member covers over the first frame member, the second frame member, and the stiffener member to conceal the mull joint on the first side.

In another embodiment, a fenestration assembly is disclosed having a first fenestration unit including a first frame member and a second fenestration unit including a second frame member. The fenestration assembly also includes a mulling system that mulls together the first fenestration unit and the second fenestration unit at a mull joint. The fenestration assembly includes a first side and a second side that are collectively defined by the first fenestration unit and the second fenestration unit. The mulling system includes a stiffener member that is disposed between the first fenestration unit and the second fenestration unit. The stiffener member extends between the first side and the second side of the fenestration assembly. The stiffener member abuts the first frame member and the second frame member. Also, the mulling system includes a cover member that attaches to the stiffener member on the first side. The cover member covers over the first frame member, the second frame member, and the stiffener member to conceal the mull joint on the first side.

In an additional embodiment, a method of mulling together a first fenestration unit and a second fenestration unit at a mull joint to define a fenestration assembly. The first fenestration unit includes a first frame member and the second fenestration unit includes a second frame member. The method includes positioning a stiffener member between the first fenestration unit and the second fenestration unit, the stiffener extending between a first side and a second side of the fenestration assembly, including abutting the stiffener member against the first frame member and the second frame member. The method also includes attaching a cover member to the stiffener member on the first side, the cover member covering over the first frame member, the second frame member, and the stiffener member to conceal the mull joint on the first side.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved mulling system for a plural fenestration assembly. The mulling system may include a stiffener member that is disposed at a mulling joint between a first frame member of a first fenestration unit and a second frame member of a second fenestration unit. The stiffener member may extend between a first side and a second side of the mulling joint in an exterior/interior direction of the fenestration assembly. The stiffener member, at the first side, may attach to a first covering member of the mulling system. The first covering member may cover over the first frame member and the second frame member as well as the stiffener member. The stiffener member, at the second side, may attach to a second covering member of the mulling system. The second covering member may cover over the first frame member and the second frame member as well as the stiffener member. Both the first and second covering members may lie substantially flat and flush against the areas surrounding the respective side of the fenestration assembly. Also, the stiffener member may include features for abutting against, fastening to, and supporting the first frame member. Moreover, the stiffener member may include features for abutting against, fastening to, and supporting both the first frame member and the second frame member. Thus, the mulling system may provide a strong and robust mull joint. Also, the mulling system may provide a low-profile, inconspicuous, and aesthetically pleasing mull joint. The mulling system may be versatile and adaptable for a variety of mull joints. In some embodiments, the mulling system may be used to mull together different types of fenestration units using many of the same parts. Assembly may be convenient. The mulling system may also provide manufacturing efficiencies as will be discussed.

Figure 1:
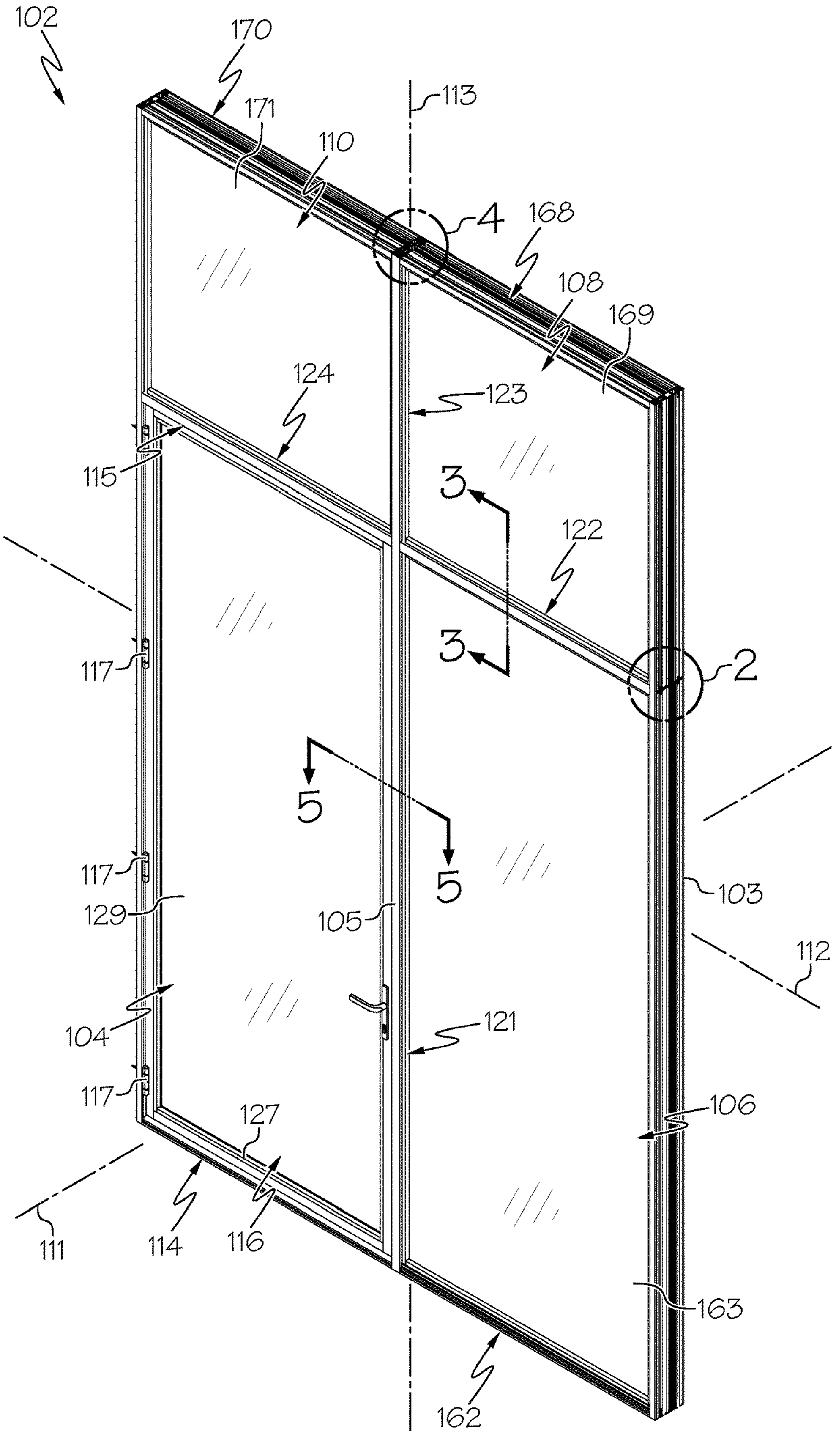
FIG. 1 is a perspective view of a plural fenestration assembly that includes a mulling system according to example embodiments of the present disclosure.

Referring now to FIG. 1 a plural fenestration assembly 102 is shown. The plural fenestration assembly 102 may include a first fenestration unit 104, a second fenestration unit 106, a third fenestration unit 108, and a fourth fenestration unit 110, each of which may be flat and rectangular in shape. The fenestration units 104, 106, 108, 110 may be assembled together edge-to-edge to collectively define the fenestration assembly 102. Collectively, the units 104, 106, 108, 110 may define a larger rectangular shape for the plural fenestration assembly 102. The plural fenestration assembly 102 may be positioned within an opening in a building or dwelling (not shown).

The fenestration assembly 102 may define a Cartesian coordinate system. Specifically, the fenestration assembly 102 may define a first axis 111, a second axis 112, and a third axis 113. The first axis 111 may extend horizontally between a first side 103 and a second side 105 of the fenestration assembly 102 (i.e., may extend in an interior/exterior direction). The second axis 112 may extend horizontally along the fenestration assembly 102 between opposite edges of the fenestration assembly 102. The third axis 113 may extend vertically along the fenestration assembly 102 between a top edge and a bottom edge.

The first side 103 and the second side 105 may be cooperatively defined by the first, second, third, and fourth fenestration units 104, 106, 108, 110. In some embodiments, the first side 103 may define an interior side of the fenestration assembly 102, and when the assembly 102 is installed in a dwelling, the first side 103 may face into the dwelling. The second side 105 may define an exterior side of the fenestration assembly 102, and when the assembly 102 is installed in a dwelling, the second side 105 may face out of the dwelling.

Although four fenestration units 104, 106, 108, 110 are included in the illustrated embodiment of FIG. 1, it will be appreciated that the fenestration assembly 102 may include any number of fenestration units. The fenestration units 104, 106, 108, 110 may also have any suitable size and shape without departing from the scope of the present disclosure. The fenestration units 104, 106, 108, 110 may include a variety of fenestration types that are mulled together in the fenestration assembly 102. There may be doors, sidelites, transoms, and/or other fenestration units 104, 106, 108, 110 that are mulled together to define the fenestration assembly 102.

For example, as shown in the illustrated embodiments, the first fenestration unit 104 may be a swinging door or swinging window unit. The first fenestration unit 104 may include a rectangular first fenestration frame 114 that pivotably supports a first panel 116 (e.g., a door panel or window sash) therein. The first panel 116 may be hingeably attached to the first fenestration frame 114 by one or more hinges 117. Accordingly, the first panel 116 may be a movable or "active" panel of the fenestration assembly 102.

The first panel 116 may include a rectangular first panel frame 127 that supports a glazing unit 129 therein. The glazing unit 129 may include a transparent pane of glass or other material. The first fenestration frame 114, the first panel frame 127, and/or other parts of the first fenestration unit 104 may be constructed from and/or include any suitable materials without departing from the scope of the present disclosure. For example, in some embodiments, the first fenestration frame 114 may be made from and/or include any of: aluminum alloy, steel, other metal, composite materials, etc.

Moreover, in some embodiments, the second, third, and fourth fenestration units 106, 108, 110 may be "inactive" (i.e., non-moving) panels or panes of the fenestration assembly 102. In some embodiments, the second fenestration unit 106 may include a rectangular second fenestration frame 162 that supports a transparent second pane 163 of glass or other material. Likewise, the third fenestration unit 108 may include a rectangular third fenestration frame 168 that supports a transparent third pane 169, and the fourth fenestration unit 110 may include a rectangular fourth fenestration frame 170 that supports a transparent fourth pane 171. The second fenestration frame 162, third fenestration frame 168, and fourth fenestration frame 170 may be constructed from and/or include any suitable materials without departing from the scope of the present disclosure. For example, in some embodiments, the second, third and fourth fenestration frames 162, 168, 170 made from and/or include any of: aluminum alloy, steel, other metal, composite materials, etc.

The second fenestration unit 106 may be a sidelite unit and may be joined to the first fenestration unit 104 at a first mull joint 121. In other words, the second fenestration frame 162 may be attached to the first fenestration frame 114 at the first mull joint 121. The first mull joint 121 is illustrated in detail according to example embodiments in FIGS. 5 and 6.

The third fenestration unit 108 may be a transom unit and may be joined to the second fenestration unit 106 at a second mull joint 122. In other words, the third fenestration frame 168 may be attached to the second fenestration frame 162 at the second mull joint 122. The second mull joint 122 is illustrated in detail according to example embodiments in FIGS. 2 and 3.

The fourth fenestration unit 110 may be another transom unit that is joined to the third fenestration unit 108 at a third mull joint 123 and that is joined to the first fenestration unit 104 at a fourth mull joint 124. In other words, the fourth fenestration frame 170 may be attached to the third fenestration frame 168 at the third mull joint 123, and the fourth fenestration frame 170 may be attached to the first fenestration frame 114 at the fourth mull joint 124. The third mull joint 123 is illustrated in detail according to example embodiments in FIG. 4. The fourth mull joint 124 may be substantially similar to the embodiments illustrated in FIGS. 5 and 6.

Arranged as such, the second fenestration unit 106 may be disposed adjacent the first fenestration unit 104, and the first mull joint 121 may extend longitudinally along the third axis 113. Moreover, the third fenestration unit 108 may be adjacent the second fenestration unit 106, and the second mull joint 122 may extend longitudinally along the second axis 112. Also, the fourth fenestration unit 110 may be adjacent the third fenestration unit 108, and the third mull joint 123 may extend longitudinally along the third axis 113. Furthermore, the first fenestration unit 104 may be adjacent the fourth fenestration unit 110, and the fourth mull joint 124 may extend longitudinally along the second axis 112. In some embodiments, the first mull joint 121 and the third mull joint 123 may be substantially co-linear and aligned in a vertical direction along the third axis 113, and in some embodiments, the second mull joint 122 and the fourth mull joint 124 may be substantially co-linear and aligned in a horizontal direction along the second axis 112.

As shown in FIGS. 1-6, the fenestration units 104, 106, 108, 110 may be assembled together into the fenestration assembly 102 using a mulling system 115. The mulling system 115 may comprise, define, and include the first mull joint 121, the second mull joint 122, the third mull joint 123, and the fourth mull joint 124. The second mull joint 122 (FIGS. 2 and 3) is an example mull joint between the inactive second and third fenestration units 106, 108. The third mull joint 123 (FIG. 4) is an example mull joint between the inactive third and fourth fenestration units 108, 110. The first mull joint 121 (i.e., an example mull joint between the active first fenestration unit 104 and the inactive second fenestration unit 106) will be discussed in reference to FIGS. 5 and 6. As shown, in some embodiments, the first mull joint 121, the second mull joint 122, and the third mull joint 123 may be substantially similar, may include common components and features, etc. The fourth mull joint 124 may be configured similar to the first, second, and third mull joints 121, 122, 123. Thus, the mulling system 115 may include relatively few parts, and these same parts may be useful in a variety of mull joints.

The mulling system 115 may include a number of components that robustly attach opposing edges of the fenestration units 104, 106, 108, 110. The mulling system 115 may provide convenience, ergonomics, time savings, and/or additional advantages. Furthermore, the mulling system 115 may have a low part count, may be highly manufacturable, and convenient to assemble and install. Furthermore, the mulling system 115 can provide improved thermal performance, for example, by limiting heat transfer in the interior-exterior direction (i.e., along the first axis 111). The mulling system 115 may include sealing members that limit moisture intrusion through the mull joint. Additionally, the mulling system 115 may be inconspicuous and may provide an aesthetically pleasing, finished look for the fenestration assembly 102. The mulling system 115 may also provide design flexibility and modularity for configuring the fenestration assembly 102 in a variety of ways for added convenience.

Figure 2:
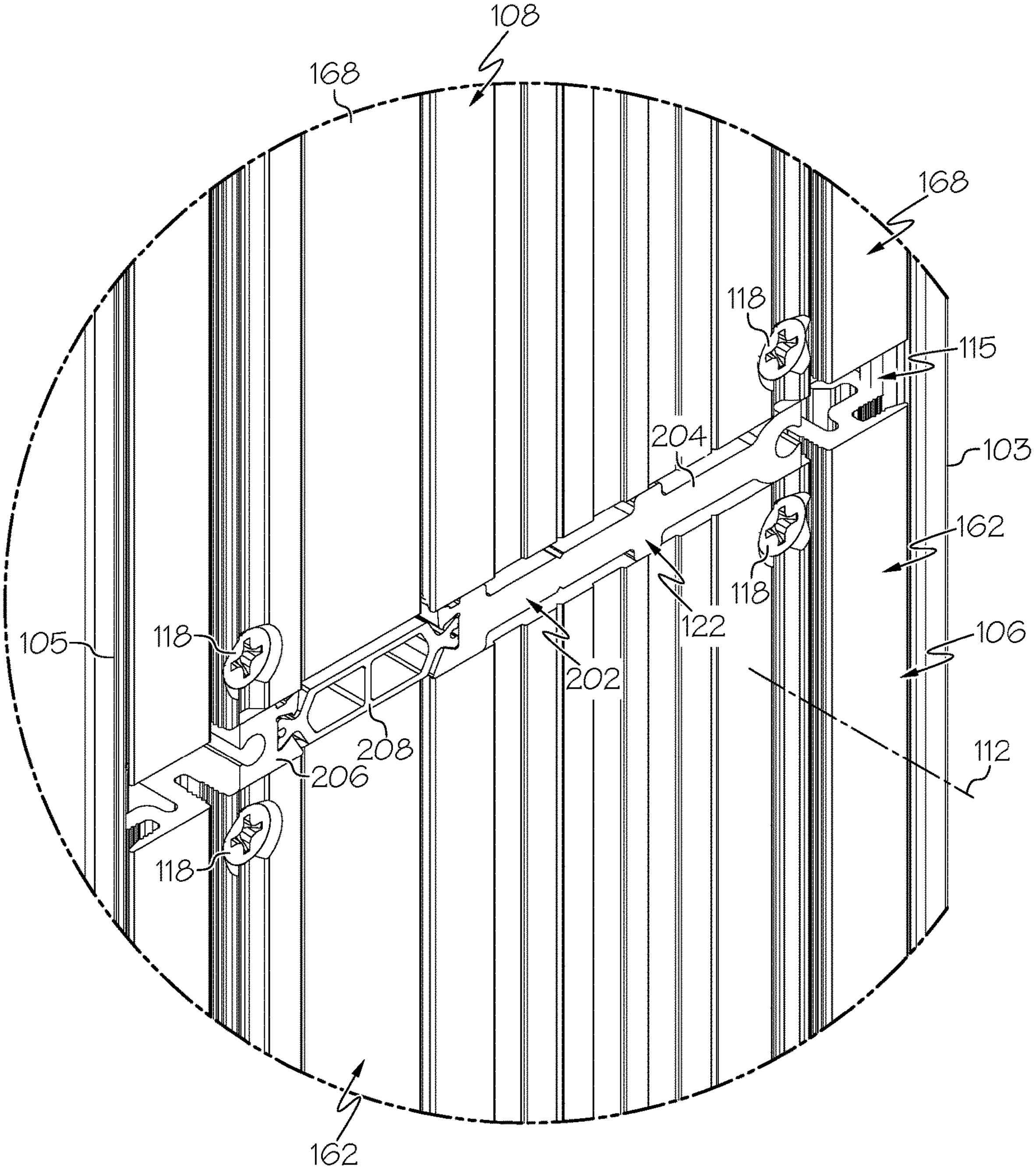
FIG. 2 is a perspective detail view of an area of the plural fenestration assembly indicated in FIG. 1.
Figure 3:
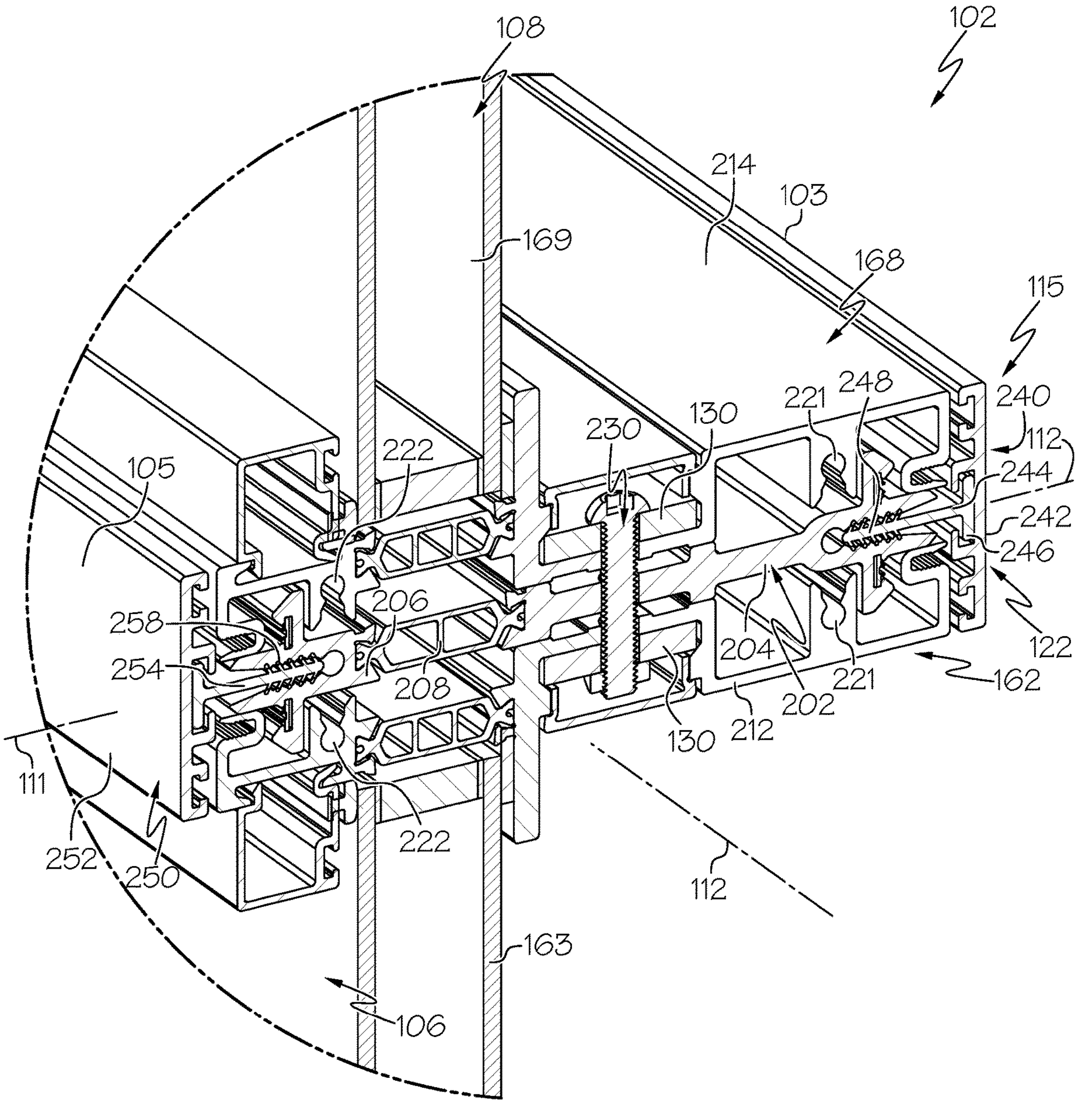
FIG. 3 is a perspective cross-sectional view of the fenestration assembly of FIG. 1 taken with reference to the line 3-3 in FIG. 1.

As shown in FIGS. 2 and 3, the mulling system 115 may generally include a mull joint stiffener 202. The mull joint stiffener 202 may be relatively thin and strip-like and may occupy the gap between the second and third fenestration units 106, 108. The mull joint stiffener 202 may extend longitudinally along the mull joint 122 (i.e., along the second axis 112). Also, the mull joint stiffener 202 may extend along the first axis 111 between the first side 103 and the second side 105 of the fenestration assembly 102.

In some embodiments the mull joint stiffener 202 may comprise a plurality of parts that are assembled together. In some embodiments, the mull joint stiffener 202 may be thermally broken so as to include one part that is attached to, but thermally isolated from, another part. For example, the mull joint stiffener 202 may comprise a first side portion 204, a second side portion 206, and a thermal break member 208 that attaches the first side portion 204 and the second side portion 206. The first side portion 204 and the second side portion 206 may be made from aluminum alloy, steel, or other metal, a composite material, or other strong and robust material. The thermal break member 208 may attach the first side portion 204 and the second side portion 206, for example, by a dovetail joint. The thermal break member 208 may have a lower thermal conductivity than the first side portion 204 and/or the second side portion 206. For example, the thermal break member 208 may be made of a polymeric material, the first and second side portions 204, 206 may be made of the same aluminum alloy, and the thermal break member 208 may have lower thermal conductivity than both the first and second side portions 204, 206.

The mull joint stiffener 202 may be disposed between the second fenestration unit 106 and the third fenestration unit 108 within the second mull joint 122 as shown in FIGS. 2 and 3. The terminal end of the second mull joint 122 is shown in FIG. 2 with the mull joint stiffener 202 partly exposed from between the second fenestration frame 162 and the third fenestration frame 168. The second mull joint 122 is sectioned in FIG. 3 to show the stiffener 202 between the second and third fenestration frames 162, 168 in greater detail. As shown, the second mull joint stiffener 202 may be layered between a second frame member 212 of the second fenestration frame 162 and a third frame member 214 of the third fenestration frame 168 (FIG. 3). As such, the second mull joint stiffener 202 may extend between the first side 103 and the second side 105 of the fenestration assembly 102 with the first side portion 204 disposed proximate the first side 103 and the second side portion 206 proximate the second side 105. Also, the first side portion 204 of the second mull joint stiffener 202 may abut and support both the second frame member 212 and the third frame member 214 as will be discussed in detail below.

In some embodiments, the second mull joint 122 may also include at least one fastener 230, such as a nut and bolt, as shown in FIG. 3. The fastener 230 may extend perpendicularly through each of the second frame member 212, the mull joint stiffener 202, and the third frame member 214. More specifically, the fastener 230 may extend through the first side portion 204 of the mull joint stiffener 202. There may be additional fasteners 230 similarly provided in the second mull joint 122, and these fasteners 230 may be spaced apart along the second axis 112. It will be appreciated that there may be any suitable number of fasteners 230 in the second mull joint 122.

Furthermore, as shown in FIG. 3, the mulling system 115 may include a first cover member 240 at the second mull joint 122. The first cover member 240 may include a covering strip 242 that is flat and strip-like. The covering strip 242 may have a straight longitudinal axis that extends along the second axis 112 in FIG. 3. In some embodiments, the covering strip 242 may be made of aluminum alloy, another metal, or a composite material. Furthermore, in some embodiments, the covering strip 242 may be formed by extrusion. The first cover member 240 may additionally include a post 244 that projects from one side (i.e., an inner side) of the covering strip 242. The post 244 may have a T-shaped cross-section and may be removably received within a corresponding channel or other aperture 246 in the covering strip 242. Also, the opposite terminal end of the post 244 may be removably attached and received in a kerf or other first opening 248 in the mull joint stiffener 202, proximate the first side 103. As such, the covering strip 242 of the first cover member 240 may be disposed at the first side 103 of the fenestration assembly 102.

When attached, the covering strip 242 of the first cover member 240 may cover over and conceal the mull joint stiffener 202 on the first side 103 of the fenestration assembly 102. Also, the covering strip 242 may have a width that is sufficient to cover over and conceal the second frame member 212, the third frame member 214, and the mull joint stiffener 202 on the first side 103 of the fenestration assembly 102. Accordingly, the covering strip 242 may conceal and cover over the second mull joint 122 on the first side 103 of the fenestration assembly 102. The covering strip 242 may also lie substantially flat on the first side 103 for providing an aesthetically pleasing, finished look.

Additionally, the mulling system 115 at the second mull joint 122 may include a second cover member 250 as shown in FIG. 3. The second cover member 250 may be substantially similar to the first cover member 240. The second cover member 250 may have mirror-image symmetry with the first cover member 240 across a plane that is normal to the first axis 111. Accordingly, like the first cover member 240, the second cover member 250 may respectively include a covering strip 252 and a post 254. The post 254 may be removably attached and received in a second opening 258 of the second mull joint stiffener 202. As such, the covering strip 252 of the second cover member 250 may cover over the stiffener 202, the second frame member 212 and the third frame member 214 on the second side 105 of the fenestration assembly 102 to conceal and cover over the second mull joint 122 on the second side 105 of the fenestration assembly 102.

As shown in FIG. 2, the fenestration assembly 102 may further include a plurality of edge fasteners 118. The edge fasteners 118 may be screws in some embodiments. The edge fasteners 118 may be installed from an exterior edge (i.e., an exposed edge) of the fenestration assembly 102. In some embodiments, one or more of the fasteners 118 may be installed through the third fenestration frame 168 and into the third frame member 214, and/or one or more of the fasteners 118 may be installed through the second fenestration frame 162 and into the second frame member 212. For example, as shown in FIG. 3, the first side portion 204 may include first side receiving openings 221 that receive respective ones of the fasteners 118. The first side receiving openings 221 may be partial holes with a longitudinal axis that runs substantially parallel to the second axis 112. Likewise, the second side portion 206 may include second side receiving openings 222 that receive other ones of the fasteners 118. The second side receiving openings 222 may be partial holes extending along the second axis 112. The fasteners 118 may further strengthen the second mull joint 122.

Figure 4:
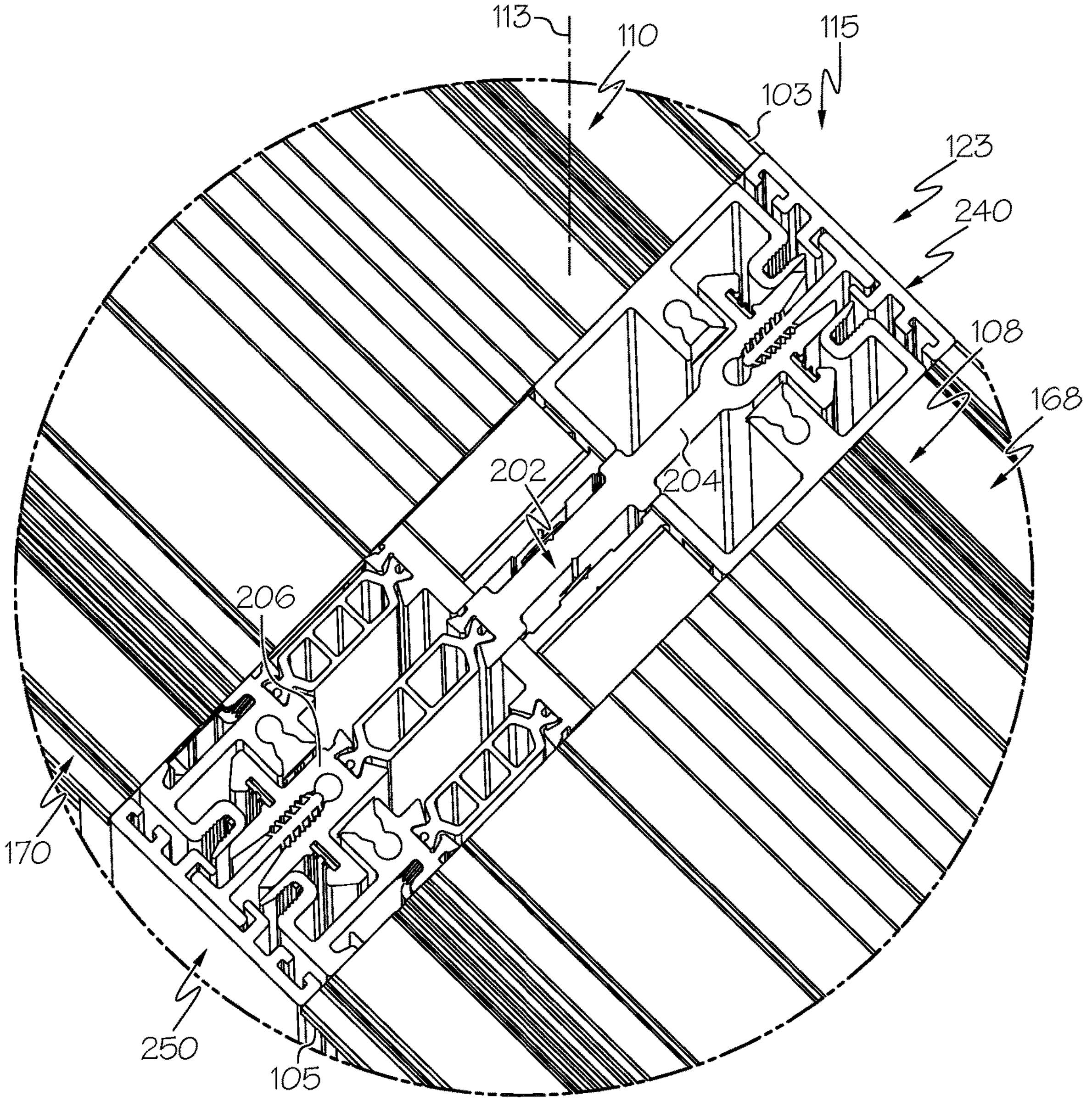
FIG. 4 is a perspective detail view of another area of the plural fenestration assembly indicated in FIG. 1.

Referring now to FIG. 4, the mulling system 115 at the third mull joint 123 will be described. Like the second mull joint 122, there may be a thermally-broken mull joint stiffener 202. At the third mull joint 123, the mull joint stiffener 202 may run longitudinally along the third axis 113, between the third and fourth fenestration frames 168, 170. The third mull joint 123 of the mulling system 115 may also include a first cover member 240 and a second cover member 250, similar to the second mull joint 122 (FIGS. 2 and 3).

Figure 5:
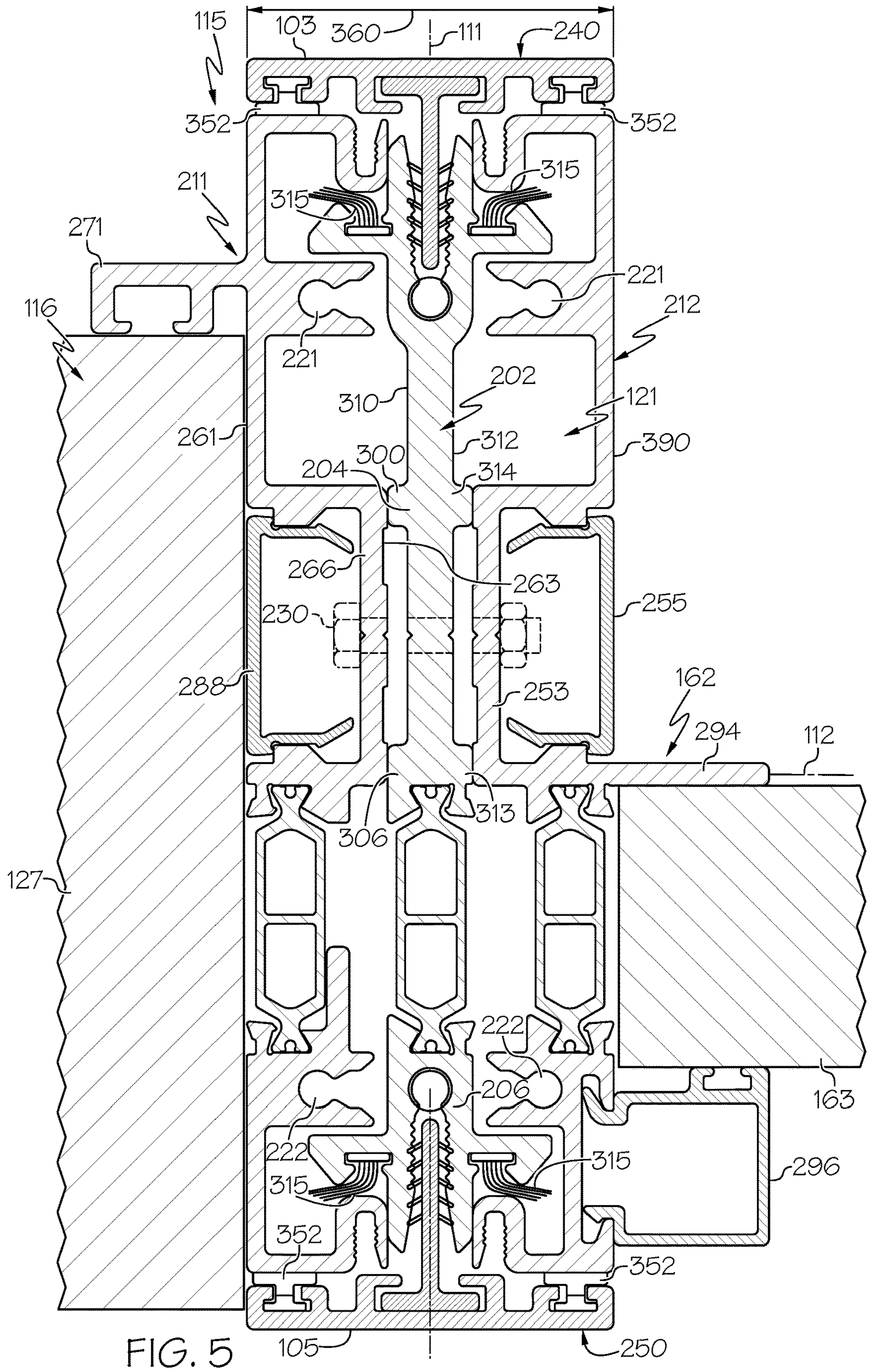
FIG. 5 is a sectional view of the fenestration assembly of FIG. 1 of the fenestration assembly taken with reference to the line 5-5 in FIG. 1.
Figure 6:
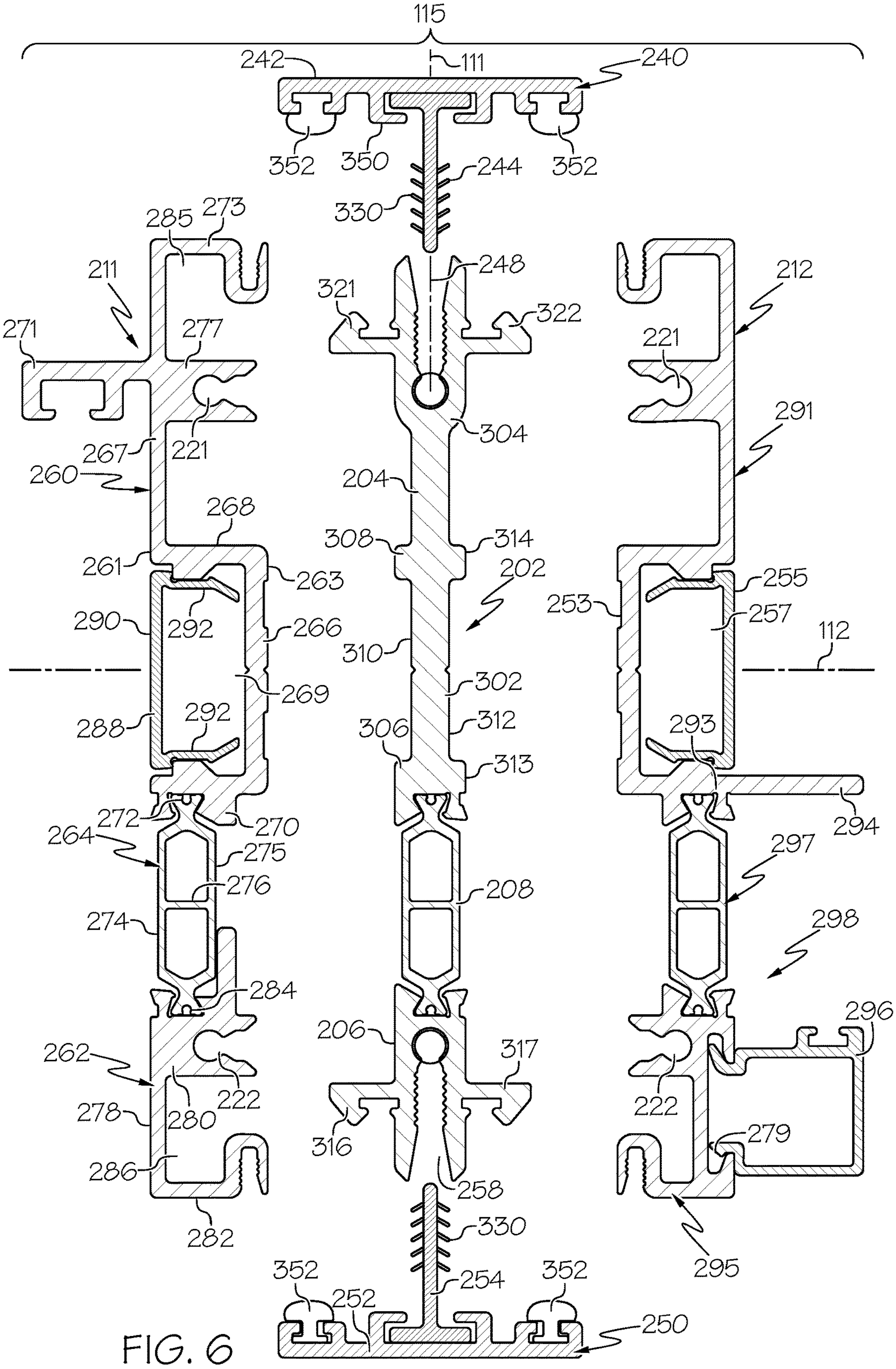
FIG. 6 is an exploded view of the fenestration assembly of FIG. 5.

Referring now to FIG. 5, the mulling system 115 at the first mull joint 121 will be discussed. FIG. 6 shows some of the same components in an exploded view. As shown, the mull joint stiffener 202, the first cover member 240, and the second cover member 250 may be respectively included at the first mull joint 121, similar to the second mull joint 122 (FIGS. 2 and 3) and similar to the third mull joint 123 (FIG. 4). Thus, the description of features of FIGS. 5 and 6 may apply to those shown in FIGS. 2-4.

The mull joint stiffener 202 may be layered between the first frame member 211 of the first fenestration frame 114 and the second frame member 212 of the second fenestration frame 162. The first frame member 211 may be a member of a side jamb of the first fenestration frame 114. The second frame member 212 may be a side jamb of the second fenestration frame 162.

The first frame member 211, in some embodiments, may have a flattened cross-sectional profile with a first inner side 261 that faces toward the first panel 116 and a second side 263 that faces in an opposite direction along the axis 112 toward the mull joint stiffener 202. As shown in FIG. 6, the first frame member 211 may be thermally broken so as to include a first side portion 260, a second side portion 262, and a thermal break member 264 that attaches the first and second side portions 260, 262. In some embodiments, the thermal break member 264 may attach via a dovetail joint to the first side portion 260 and/or the second side portion 262. The first side portion 260, the second side portion 262, and the thermal break member 264 may be formed via an extrusion process. In some embodiments, the first side portion 260 and the second side portion 262 may be formed from a material that has a higher thermal conductivity than the thermal break member 264 or may otherwise exhibit this difference in thermal conductivity. For example, the first and second side portions 260, 262 may be formed of an aluminum alloy whereas the thermal break member 264 may be formed of a polymeric material that is thermally insulative in comparison. Thus, the thermal break member 264 may inhibit heat transfer through the first frame member 211, for example, between the interior and exterior of the dwelling (i.e., along the first axis 111).

As shown in FIG. 6, the first side portion 260 may be a unitary, relatively thin-walled member with a mull seating strip 266 and a backing strip 267 that may be offset from each other along the second axis 112 so as to define a channel 269 on the first inner side 261 of the first frame member 211. Also, the first side portion 260 may include a stop 271 on the first inner side 261 that projects from the backing strip 267 along the second axis 112. The first side portion 260 may include a first flange 273 and a claw-shaped projection 277 that project toward the mull joint stiffener 202. The first flange 273 and claw-shaped projection 277 may be offset along the first axis 111 so as to define a first pocket channel 285 therebetween. The first pocket channel 285 may be cooperatively defined by the backing strip 267, the first flange 273, and the claw-shaped projection 277. The claw-shaped projection 277 may include one of the first side receiving openings 221 mentioned above.

The backing strip 267 may be attached to the mull seating strip 266 by a support rail 268. The support rail 268 may have a width (measured along the second axis 112) that defines the amount of offset between the seating strip 266 and the backing strip 267. Also, the first side portion 260 may include a second flange 270, which projects from the edge opposite that of the first flange 273. The second flange 270 may project along the second axis 112 from the seating strip 266, away from the mull joint stiffener 202. The second flange 270 may include an aperture 272 (e.g., a dovetail groove) that faces along the first axis 111 and that receives and attaches to the thermal break member 264.

The thermal break member 264 may be a hollow member with a first wall 274, a second wall 275, and an internal wall 276. The internal wall 276 may extend substantially perpendicular to the first and second walls 274, 275. The thermal break member 264 may be received at one edge in the aperture 272. The other edge may be attached to the second side portion 262 of the first frame member 211.

The second side portion 262 may include a support strip 278, an attachment edge 280, and an outer flange 282. The attachment edge 280 may be include a dovetail-shaped groove 284 that receives the thermal break member 264. The outer flange 282 may project along the second axis 112 on an opposite edge from the attachment edge 280. The outer flange 282 may project toward the mull joint stiffener 202. The flange 282 and the edge 280 may be offset along the first axis 111. Accordingly, the second side portion 262 may include a second pocket channel 286 that is open at the second side 263 of the first frame member 211, toward the mull joint stiffener 202. The second pocket channel 286 may be cooperatively defined by the outer flange 282, the support strip 278, and the attachment edge 280. The attachment edge includes the second side receiving openings 222 mentioned above.

Moreover, the first frame member 211 may include a first covering strip 288 having a flat, thin cover 290 as well as leg flanges 292. The leg flanges 292 may be received and engaged within the channel 269 of the first side portion 260 such that the cover 290 covers over the channel 269 and the fastener 230 therein. The first covering strip 288 may be attached to the first side portion 260 such that the cover 290 is substantially flush with the surrounding portions of the first side portion 260 and such that the first inner side 261 is substantially planar.

The second frame member 212 may be substantially similar to the first frame member 211 except as noted. Thus, details will not be repeated for purposes of brevity. The second frame member 212 may be different because the second frame member 212 may be configured for supporting a fixed panel (i.e., the second pane 163) rather than an active panel (i.e., the hingeably-attached first panel 116).

The second frame member 212 may include a first side portion 291 and a second side portion 295 that are joined by a thermal break member 297, similar to the first frame member 211. However, instead of the stop 271, the first side portion 291 may include a first pane stop 294 that is an extension of a second flange 293. Also, the second side portion 295 may include an attachment track 279 that receives, removably attaches to, and retains a second pane stop 296. Thus, the first pane stop 294 and the second pane stop 296 may cooperatively define a gap 298 for receiving and retaining the second pane 163.

The first side portion 291 of the second frame member 212 may also include a second seating strip 253, which may share mirror-image symmetry with the mull seating strip 266 across an imaginary mulling plane that is normal to the second axis 112. Also, a second covering strip 255 may attach and cover over a second channel 257 of the first side portion 291.

The mull joint stiffener 202 may include the features discussed above relating to the stiffeners 202 of FIGS. 2-4. As shown in FIG. 6, the mull joint stiffener 202 may include the first side portion 204 and the second side portion 206, which are joined by the thermal break member 208. The first side portion 204, the second side portion 206, and the thermal break member 208 may collectively define a first face 310 of the mull joint stiffener 202 and a second face 312 of the mull joint stiffener 202.

The first side portion 204 may be a unitary, thin strip. The first side portion 204 may include a mull seating strip 302 and a coupling end 304, which are spaced apart along the first axis 111. The seating strip 302 may include a first ridge 306 and a second ridge 308 on the first face 310 as well as a third ridge 313 and a fourth ridge 314 on the second face 312. The first ridge 306 and the third ridge 313 may be spaced apart along the first axis 111 from the second ridge 308 and the fourth ridge 314, respectively. The first ridge 306 and the third ridge 313 may be substantially aligned along the second axis 112. The second ridge 308 and the fourth ridge 314 may be substantially aligned along the second axis 112. The first side portion 204 may further include an aperture (e.g., a dovetail groove) along an edge that receives and retains the thermal break member 208. On the opposite edge, the first side portion 204 may include the first opening 248 that receives the first cover member 240. The first side portion 204 may further include a first seal retainer channel 321 and a second seal retainer channel 322 that project from opposite faces 310, 312 of the first side portion 204. As shown in FIG. 5, the retainer channels 321, 322 may receive and retain seal members 315. The seal members 315 may be brush seals, fan seals, or pile-type seals in various embodiments.

The thermal break member 208 may be substantially similar to the thermal break member 264 and the thermal break member 297. In some embodiments, the thermal break members 208, 264, 297 may be the same part.

The second side portion 206 may attach to the thermal break member 208. On the opposite edge, the second side portion 206 may include the second opening 258 that receives the second cover member 250. Also, the second side portion 206 may include a first seal retainer channel 316 and a second seal retainer channel 317 that project from opposite faces 310, 312 of the second side portion 206. As shown in FIG. 5, the retainer channels 316, 317 may receive and retain seal members 315.

The first cover member 240 may include the post 244 and the covering strip 242 as mentioned above. In some embodiments, a head of the post 244 of the first cover member 240 may be removably attached and received within a groove in an underside surface 350 of the covering strip 242. The underside surface 350 may also include channels for receiving and retaining resilient seal members 352 on both sides of the post 244. The post 244 may include resiliently flexible barbs 330 that are angled toward the mull joint stiffener 202. The second cover member 250 may be substantially the same (e.g., identical to) the first cover member 240.

To assemble (i.e., mull together) the first fenestration unit 104 and the second fenestration unit 106 at the first mull joint 121, a method of assembly may be followed, which is apparent from FIGS. 1-6. More specifically, the mull joint stiffener 202, the first frame member 211, and the second frame member 212 may be individually assembled with the respective thermal break members 264, 208, 297.

Next, the frames 114, 162, 168, 170 and the mull joints 121, 122, 123, 124 may be assembled together before the panel 116 and panes 163, 169, 171 are installed. Specifically, using FIG. 5 as an example, the mull seating strip 266 may be abutted against the first and second ridges 306, 308 of the mull joint stiffener 202, and the second seating strip 253 may be abutted against the third and fourth ridges 313, 314. When layered, the ridges 306, 308, 313, 314 may be aligned and abuttingly stacked against respective ridges of the seating strips 266, 253. These aligned ridges may provide a high amount of bending stiffness along the mull joint 121.

Subsequently, the fastener 230 may be extended through the mull seating strip 266, the mull joint stiffener 202, and the second seating strip 253. Additional fasteners 230 may be used for attachment at other locations along the first mull joint 121 (i.e., along the third axis 113). Also, the edge fasteners 118 may be installed into the first and second side receiving openings 221, 222 as discussed above. Thus, the mull joints may be very strong, may resist bending, and may be relatively easy and convenient to assemble. Additionally, the second pane 163 may be installed into the second fenestration frame 162, and the first panel 116 may be hingeably attached to the first fenestration frame 114. The other mull joints may be similarly formed, and the other panes may be similarly installed.

Next, the covering strip 288 may be attached to cover over the channel 269. The covering strip 255 may be similarly attached to cover over the channel 157. Subsequently, the first cover member 240 may be inserted into the first opening 248. The barbs 330 may resiliently flex against the post 244 and grip the internal surfaces of the first opening 248 to retain the cover member 240 attached to the mull joint stiffener 202. The second cover member 250 may be similarly inserted into the second opening 258.

As shown in FIG. 5, the first and second cover members 240, 250 may have a width 360. The width 360 may be defined along the second axis 112, across the mull joint 121, from one edge of the covering strip 242 to the opposite edge thereof. The second covering strip 252 may have substantially the same width 360. The width 360 may be enough to extend to the first inner side 261 of the first frame member 211 and to extend to an opposite second inner side 390 of the second frame member 212. The distance between the first inner side 261 to the second inner side 390 may be substantially equal or less than the width 360. The cover member 240 may, thus, cover over the first mull joint 121. The width 360 may be equal to the distance between the first and second inner sides 261, 390 and may remain substantially equal along the mull joint 121 (i.e., along the first axis 111). This width 360 may be reduced for a low-profile mull joint 121.

Additionally, the mull joint 121 may provide thermal protection because the thermal break members 208, 264, 297. The mull joint 121 may also protect against moisture intrusion due to the seal members 352 providing a seal underneath the cover members 240, 250. Also, the seal members 315 may deform and bend to be received within the pocket channels 285, 286, thereby providing additional protection. Seal members 315 may similarly engage with the second frame member 212 as shown in FIG. 5.

Thus, the mulling system 115 may be aesthetically pleasing. In addition, the mulling system 115 may provide a reduced profile (i.e., relatively small width 360) for further enhancing aesthetics. Also, the mulling system 115 may be very robust and strong. The mulling system 115 may include relatively few parts and may be convenient and relatively easy to assemble. Furthermore, the mulling system 115 may be highly manufacturable. Moreover, the mulling system 115 can provide improved thermal performance, for example, by limiting heat transfer in the interior-exterior direction (i.e., along the first axis 111). The mulling system 115 may include sealing members that limit moisture intrusion through the mull joint. Additionally, the mulling system 115 may be inconspicuous and may provide an aesthetically pleasing, finished look for the fenestration assembly 102. The mulling system 115 may also provide design flexibility and modularity for configuring the fenestration assembly 102 in a variety of ways for added convenience.

Also, the following examples are provided:

In an example, a mulling system is provided for mulling together a first fenestration unit and a second fenestration unit at a mull joint to define a fenestration assembly. The fenestration assembly includes a first side and a second side that are cooperatively defined by the first fenestration unit and the second fenestration unit. The first fenestration unit includes a first frame member and the second fenestration unit includes a second frame member. The mulling system includes a stiffener member that is disposed between the first fenestration unit and the second fenestration unit. The stiffener member extends between the first side and the second side of the fenestration assembly. The stiffener member abuts the first frame member and the second frame member. The mulling system also includes a cover member that attaches to the stiffener member on the first side. The cover member covers over the first frame member, the second frame member, and the stiffener member to conceal the mull joint on the first side.

In an optional example, the cover member is a first cover member, and the mulling system further comprises a second cover member that attaches to the stiffener member on the second side. The second cover member covers over the first frame member, the second frame member, and the stiffener member to conceal the mull joint on the second side.

In an additional option, the stiffener member includes a first side portion proximate the first side, a second side portion proximate the second side, and a thermal break member that attaches the first side portion and the second side portion. The thermal break member has lower thermal conductivity than at least one of the first and second side portions.

In an additional option, the cover member is removably attached and received in the stiffener member.

In an additional option, the mulling system further comprises a seal member that is attached to the stiffener member and that substantially seals against one of the first frame member and the second frame member.

In an additional option, the mulling system further comprises a seal member that is attached to the cover member and that provides a seal between the cover member and one of the first frame member and the second frame member.

In an additional option, the stiffener member includes a seating strip. The first frame member includes a first mull seating strip, and the second frame member includes a second mull seating strip. The seating strip of the stiffener member, the first mull seating strip, and the second mull seating strip are layered together in abutting contact. Also, the mulling system further comprises a fastener that extends through the seating strip of the stiffener member, the first mull seating strip, and the second mull seating strip.

As an option, the seating strip of the stiffener member includes a face that faces the first frame member. Also, the seating strip of the stiffener member includes a ridge that projects from the face, and the ridge abuts against the first mull seating strip.

In an additional option, the cover member defines a first width measured across the mull joint. The cover member is a first cover member. The mulling system further includes a second cover member that attaches to the stiffener member on the second side. The second cover member covers over the first frame member, the second frame member, and the stiffener member to conceal the mull joint on the second side. The second cover member defines a second width measured across the mull joint. The first frame member has a first side facing outward from the mull joint and the second frame member has a second side facing outward from the mull joint in a direction opposite the first face. The first frame member and the second frame member cooperatively define a third width measured across the mull joint from the first side to the second side. The first width, the second width, and the third width are substantially equal.

As another example, a fenestration assembly is disclosed having a first fenestration unit including a first frame member and a second fenestration unit including a second frame member. The fenestration assembly also includes a mulling system that mulls together the first fenestration unit and the second fenestration unit at a mull joint. The fenestration assembly includes a first side and a second side that are collectively defined by the first fenestration unit and the second fenestration unit. The mulling system includes a stiffener member that is disposed between the first fenestration unit and the second fenestration unit. The stiffener member extends between the first side and the second side of the fenestration assembly. The stiffener member abuts the first frame member and the second frame member. Also, the mulling system includes a cover member that attaches to the stiffener member on the first side. The cover member covers over the first frame member, the second frame member, and the stiffener member to conceal the mull joint on the first side.

In an optional example, the cover member is a first cover member and further comprising a second cover member that attaches to the stiffener member on the second side, the second cover member covering over the first frame member, the second frame member, and the stiffener member to conceal the mull joint on the second side.

As an optional example, the stiffener member includes a first side portion proximate the first side, a second side portion proximate the second side, and a thermal break member that attaches the first side portion and the second side portion. The thermal break member has lower thermal conductivity than at least one of the first and second side portions.

As an optional example, the cover member is removably attached and received in the stiffener member.

In an optional example, the fenestration assembly further comprises a seal member that is attached to the stiffener member and that substantially seals against one of the first frame member and the second frame member.

As an optional example, the fenestration assembly further comprises a seal member that is attached to the cover member and that provides a seal between the cover member and one of the first frame member and the second frame member.

In an optional example, the stiffener member includes a seating strip. The first frame member includes a first mull seating strip, and the second frame member includes a second mull seating strip. The seating strip of the stiffener member, the first mull seating strip, and the second mull seating strip are layered together in abutting contact. The fenestration assembly further comprises a fastener that extends through the seating strip of the stiffener member, the first mull seating strip, and the second mull seating strip.

In an optional example, the seating strip of the stiffener member includes a face that faces the first frame member. Also, the seating strip of the stiffener member includes a ridge that projects from the face, the ridge abutting against the first mull seating strip.

In an optional example, the cover member defines a first width measured across the mull joint. The cover member is a first cover member. The fenestration assembly further comprises a second cover member that attaches to the stiffener member on the second side. The second cover member covers over the first frame member, the second frame member, and the stiffener member to conceal the mull joint on the second side. The second cover member defines a second width measured across the mull joint. The first frame member has a first side facing outward from the mull joint, and the second frame member has a second side facing outward from the mull joint in a direction opposite the first face. The first frame member and the second frame member cooperatively define a third width measured across the mull joint from the first side to the second side. The first width, the second width, and the third width are substantially equal.

In an additional embodiment, a method of mulling together a first fenestration unit and a second fenestration unit at a mull joint to define a fenestration assembly. The first fenestration unit includes a first frame member and the second fenestration unit includes a second frame member. The method includes positioning a stiffener member between the first fenestration unit and the second fenestration unit, the stiffener extending between a first side and a second side of the fenestration assembly, including abutting the stiffener member against the first frame member and the second frame member. The method also includes attaching a cover member to the stiffener member on the first side, the cover member covering over the first frame member, the second frame member, and the stiffener member to conceal the mull joint on the first side.

In an optional example, the stiffener member includes a seating strip, the first frame member includes a first mull seating strip, and the second frame member includes a second mull seating strip. Also, the method further includes layering the seating strip of the stiffener member, the first mull seating strip, and the second mull seating strip together in abutting contact. Additionally, the method includes extending a fastener through the seating strip of the stiffener member, the first mull seating strip, and the second mull seating strip.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A mulling system for mulling together a first fenestration unit and a second fenestration unit at a mull joint to define a fenestration assembly with the fenestration assembly including a first side and a second side that are cooperatively defined by the first fenestration unit and the second fenestration unit, the first fenestration unit including a first frame member with a first mull seating strip and a backing strip, the backing strip being offset from the first mull seating strip so as to define a channel of the first frame member, and the second fenestration unit including a second frame member with a second mull seating strip, the mulling system comprising:

a stiffener member that is disposed within the mull joint along a first axis extending between the first fenestration unit and the second fenestration unit, the stiffener member extending along a second axis between the first side and the second side of the fenestration assembly, the stiffener member including a seating strip abutting the first frame member and abutting the second frame member, the seating strip having a solid cross section in a plane defined by the first axis and the second axis, the seating strip, the first mull seating strip, and the second mull seating strip being layered together in sequence along the first axis in abutting contact;

a cover member that attaches to the stiffener member on the first side, the cover member covering over the first frame member, the second frame member, and the stiffener member to conceal the mull joint on the first side; and a fastener that is partly received in the channel and that extends through the seating strip of the stiffener member, the first mull seating strip, and the second mull seating strip.

2. The mulling system of claim 1, wherein the cover member is a first cover member and further comprising a second cover member that attaches to the stiffener member on the second side, the second cover member covering over the first frame member, the second frame member, and the stiffener member to conceal the mull joint on the second side.

3. The mulling system of claim 1, wherein the stiffener member includes a first side portion proximate the first side, a second side portion proximate the second side, and a thermal break member that attaches the first side portion and the second side portion, the thermal break member having lower thermal conductivity than at least one of the first and second side portions.

4. The mulling system of claim 1, wherein the cover member is removably attached and received in the stiffener member.

5. The mulling system of claim 1, further comprising a seal member that is attached to the stiffener member and that substantially seals against one of the first frame member and the second frame member.

6. The mulling system of claim 1, further comprising a seal member that is attached to the cover member and that provides a seal between the cover member and one of the first frame member and the second frame member.

7. The mulling system of claim 1, wherein the seating strip of the stiffener member includes a face that faces the first frame member, and wherein the seating strip of the stiffener member includes a ridge that projects from the face, the ridge abutting against the first mull seating strip.

8. The mulling system of claim 1, wherein the cover member defines a first width measured along the first axis across the mull joint;

wherein the cover member is a first cover member and further comprising a second cover member that attaches to the stiffener member on the second side, the second cover member covering over the first frame member, the second frame member, and the stiffener member to conceal the mull joint on the second side;

wherein the second cover member defines a second width measured along the first axis across the mull joint;

wherein the first frame member has a first inner side facing away from the mull joint and the second frame member has a second inner side facing away from the mull joint in a direction opposite the first inner side;

wherein the first frame member and the second frame member cooperatively define a third width measured along the first axis across the mull joint from the first inner side to the second inner side; and wherein the first width and the second width are at least equal to the third width.

9. A fenestration assembly comprising:

a first fenestration unit including a first frame member with a first mull seating strip and a backing strip, the backing strip being offset from the first mull seating strip so as to define a channel of the first frame member;

a second fenestration unit including a second frame member with a second mull seating strip;

a mulling system that mulls together the first fenestration unit and the second fenestration unit at a mull joint, the fenestration assembly including a first side and a second side that are collectively defined by the first fenestration unit and the second fenestration unit, the mulling system including:

a stiffener member that is disposed within the mull joint along a first axis extending between the first fenestration unit and the second fenestration unit, the stiffener member extending along a second axis between the first side and the second side of the fenestration assembly, the stiffener member including a first side portion proximate the first side, a second side portion proximate the second side, and a thermal break member that attaches the first side portion and the second side portion, the thermal break member having lower thermal conductivity than the first side portion and the second side portions, one of the first side portion and the second side portion including a seating strip abutting the first frame member and abutting the second frame member, the first side portion and the second side portion being non-hollow to respectively have a solid cross section in a plane defined by the first axis and the second axis, the seating strip, the first mull seating strip, and the second mull seating strip being layered together in sequence along the first axis in abutting contact;

a cover member that attaches to the first side portion of the stiffener member on the first side, the cover member covering over the first frame member, the second frame member, and the stiffener member to conceal the mull joint on the first side; and a fastener that is partly received in the channel and that extends through the seating strip of the stiffener member, the first mull seating strip, and the second mull seating strip.

10. The fenestration assembly of claim 9, wherein the cover member is a first cover member and further comprising a second cover member that attaches to the second side portion of the stiffener member on the second side, the second cover member covering over the first frame member, the second frame member, and the stiffener member to conceal the mull joint on the second side.

11. The fenestration assembly of claim 9, wherein the cover member is removably attached and received in the first side portion of the stiffener member.

12. The fenestration assembly of claim 9, further comprising a seal member that is attached to the stiffener member and that substantially seals against one of the first frame member and the second frame member.

13. The fenestration assembly of claim 9, further comprising a seal member that is attached to the cover member and that provides a seal between the cover member and one of the first frame member and the second frame member.

14. The fenestration assembly of claim 9, wherein the seating strip of the stiffener member includes a face that faces the first frame member, and wherein the seating strip of the stiffener member includes a ridge that projects from the face, the ridge abutting against the first mull seating strip.

15. The fenestration assembly of claim 9, wherein the cover member defines a first width measured along the first axis across the mull joint;

wherein the cover member is a first cover member and further comprising a second cover member that attaches to the stiffener member on the second side, the second cover member covering over the first frame member, the second frame member, and the stiffener member to conceal the mull joint on the second side;

wherein the second cover member defines a second width measured across the mull joint;

wherein the first frame member has a first inner side facing away from the mull joint and the second frame member has a second inner side facing away from the mull joint in a direction opposite the first inner side;

wherein the first frame member and the second frame member cooperatively define a third width measured along the first axis across the mull joint from the first inner side to the second inner side; and wherein the first width and the second width are at least equal to the third width.

16. A method of mulling together a first fenestration unit and a second fenestration unit at a mull joint to define a fenestration assembly, the first fenestration unit including a first frame member with a first mull seating strip and a backing strip, the backing strip being offset from the first mull seating strip so as to define a channel of the first frame member, the second fenestration unit including a second frame member with a second mull seating strip, the method comprising:

positioning a stiffener member along a first axis extending between the first fenestration unit and the second fenestration unit, the stiffener member extending along a second axis between a first side and a second side of the fenestration assembly, the stiffener member including a seating strip, the seating strip having a solid cross section in a plane defined by the first axis and the second axis;

layering the seating strip of the stiffener member, the first mull seating strip, and the second mull seating strip together in sequence along the first axis in abutting contact;

extending a fastener through the seating strip of the stiffener member, the first mull seating strip, and the second mull seating strip, the fastener being partly received in the channel; and attaching a cover member to the stiffener member on the first side, the cover member covering over the first frame member, the second frame member, and the stiffener member to conceal the mull joint on the first side.

* * * * *